United States Patent
Yamada et al.

(10) Patent No.: US 10,151,857 B2
(45) Date of Patent: Dec. 11, 2018

(54) DOWNHOLE INTERPRETATION TECHNIQUES USING BOREHOLE DIPS

(71) Applicant: Schlumberger Technology Corporation, Sugar Land, TX (US)

(72) Inventors: Tetsushi Yamada, Clamart (FR); Isabelle Le Nir, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 11 days.

(21) Appl. No.: 15/416,322

(22) Filed: Jan. 26, 2017

(65) Prior Publication Data

US 2017/0227675 A1 Aug. 10, 2017

(30) Foreign Application Priority Data

Feb. 10, 2016 (EP) ..................... 16290032

(51) Int. Cl.
*G06F 19/00* (2018.01)
*G01V 99/00* (2009.01)

(52) U.S. Cl.
CPC .... *G01V 99/005* (2013.01); *G01V 2210/1429* (2013.01)

(58) Field of Classification Search
CPC . G01V 11/00; G01V 1/301; G01V 2210/6163
USPC ..................... 702/10–14, 182–185
See application file for complete search history.

(56) References Cited

U.S. PATENT DOCUMENTS

| 4,357,660 A | 11/1982 | Hepp |
| 8,793,113 B2 | 7/2014 | Marza et al. |
| 2011/0098929 A1* | 4/2011 | Tabanou ............... G01V 3/083 702/7 |

OTHER PUBLICATIONS

Etchecopar A., Bonnetain J.L., 1992, Cross sections from dipmeter data, AAPG Bulletin, 76 (5), 621-637.
Etchecopar A., Dubas M.O., 1992, Methods for Geological Interpretation of Dips, SPWLA 33rd Annual Logging Symposium, Jun. 14-17, 1992 (21 pages).
Marza, P., Trøan, L.I., Bakke, B.A., Perna, F., V. de Leeuw, Khan, A., Bower, M. Charef-Khodja, H., 2014, Accurate structural model in near-well space from borehole images, EAGE Borehole Geology Workshop, Optimizing the Use of Your Borehole Image Data, Oct. 12-15, 2014, Dubai, United Arab Emirates. (12 pages).
Suppe, J., 1985, Principles of Structural Geology,—Extrapolation and Interpolation: Busk and Kink Methods—New Jersey, Prentice-Hall, pp. 60-65.
Ozkaya, Sait, "Kinkfold—An AutoLISP Program for Construction of Geological Cross-Sections Using Borehole Imaging Data", Computers and Geosciences 28, pp. 409-420, 2002.

* cited by examiner

*Primary Examiner* — Edward Raymond
(74) *Attorney, Agent, or Firm* — Michael Dae (57) ABSTRACT

Embodiments of the disclosure involve a method comprising a method comprising inputting borehole dip data; determining characteristics of a plurality of dips based on the borehole dip data; applying one or more geological models to the characteristics; and generating one or more geological cross-sections based on geological modeling.

20 Claims, 5 Drawing Sheets

DOWNHOLE INTERPRETATION TECHNIQUES USING BOREHOLE DIPS

CROSS-REFERENCE TO RELATED APPLICATIONS

This application claims priority to and the benefit of European Patent Application No. 16290032.8, titled "Downhole Interpretation Techniques Using Borehole DIPs," filed Feb. 10, 2016, the entire disclosure of which is hereby incorporated herein by reference.

BACKGROUND

The present disclosure relates to a method for interpreting a formation surrounding a borehole, as well as systems and methods for analyzing formation geology using borehole dip data.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions.

Borehole image data may be utilized to evaluate the geometry and geology of formation surrounding the borehole. The analysis of borehole image data may lead to a better understanding of geological structures in a wellbore, including the identification of structural (e.g., bedding, faults, nonconformities, etc.) and sedimentary (e.g., crossbedding basal conglomerates, etc.) features. Distinguishing certain structural and sedimentary features from non-structural geological events may increase the confidence and accuracy of formation interpretation and reservoir description.

SUMMARY

Embodiments of the disclosure involve a method for characterizing laminations. The method involves inputting dips, which may be manually created or obtained through semi-automatic dip picking, and computes statistics and density of the lamination environment. The computed lamination environment data may be corrected for borehole deviation, such that they may be analyzed and compared regardless of borehole deviation. As such, sequence recognition may be performed in single wells or multiple wells. The present embodiments also involve identifying and studying different scales of laminations and bedding, which may provide additional information for further interpretation. Embodiments may also include extracting information from particular lamination types based on their image properties. Embodiments may further involve a lamination sequence recognition method, which may input such quantitative information and may be used for well-to-well correlation, horizontal well correlation analysis, or geological trend analysis.

Embodiments of the disclosure involve a method comprising a method comprising inputting borehole dip data; determining characteristics of a plurality of dips based on the borehole dip data; applying one or more geological models to the characteristics; and generating one or more geological cross-sections based on geological modeling.

The method further may include pre-processing the borehole dip data using filtering, smoothing, calibrating, or combinations thereof. The method may further include removing perturbed dips inconsistent with a regional geological structure. The method may further include analyzing the borehole dip data to determine a zone, model, polarity, or combinations thereof, of the plurality of dips. The method may further include computing the lamination properties comprises classifying lamination according to thick laminations or thin laminations.

In some embodiments, applying one or more geological models comprises applying a web model utilizing bisectors of perpendicular lines drawn between two adjacent dips of the plurality of dips. In some embodiments applying the web model comprises determining a plurality of bisector threads, each bisector thread of the plurality of bisector threads being a bisector of a perpendicular of two adjacent dips; placing each bisector thread between its respective two adjacent dips; identifying an intersection of the plurality of bisector threads, wherein the intersection is a point closest to a wellbore trajectory; determining a new iteration of a plurality threads including an intersection thread from the intersection; and iteratively determining a new iteration of the plurality of threads until there is no more intersection of the threads. The method may further include creating a hinge zone based on the iterative threads. The method may further include extending input dips from the borehole dip data into the hinge zone. The method may further include generating a cross-section based on the extension of input dips.

In accordance with the present disclosure, combinations of any of these features are considered.

DETAILED DESCRIPTION

One or more specific embodiments of the present disclosure will be described below. These described embodiments are just examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Structural analysis of borehole image data may be used to create geological cross-sections of formation surrounding a borehole. Some techniques to better understand the geometry of geological structures around a well include complementing a structural description from seismic data, but such data may be costly to acquire, and good quality seismic data may be difficult when layer boundaries dip steeply (e.g., at the limb of folds or around salt bodies). Near-well structural interpretation can also be initiated using only borehole dips of a single well, but such interpretation may involve considerable expertise as well as knowledge of the local geology. Manually drawing geological cross-sections may also be time consuming. Additionally, techniques for constructing cross-sections with parallel layers may be suitable for regional and basin scale, but may not be sufficiently robust with real data.

The present techniques involve one or more embodiments of a web model workflow for analyzing borehole dip data to generate a cross-section representative of the formation. In some embodiments, the workflow may result in the instantaneous generation of geological cross-sections, as well as the combination of cross-sections and/or dip data from multiple wells for an expansive model of geological structures over formation around one or more wells.

In accordance with the present techniques, structural features, such as bedding, faults, and nonconformities, etc., and sedimentary features such as cross-bedding and basal conglomerates, etc., may be recognized and distinguished from non-structural geological events. The identification of structural and sedimentary features and distinguishing of these features from non-structural events may improve the confidence and accuracy of interpretation and reservoir description. Accurate near-well structural analysis may be used to analyze parallel layers, especially those with folds creating oil traps. The workflow of the present techniques may also make near-well structural analysis more accessible while shortening process times. Furthermore, structural analyses may also be more accurate and more automated when embodiments of the present techniques are used in combination with other techniques such as automated dip detection and classification.

Figure 1:
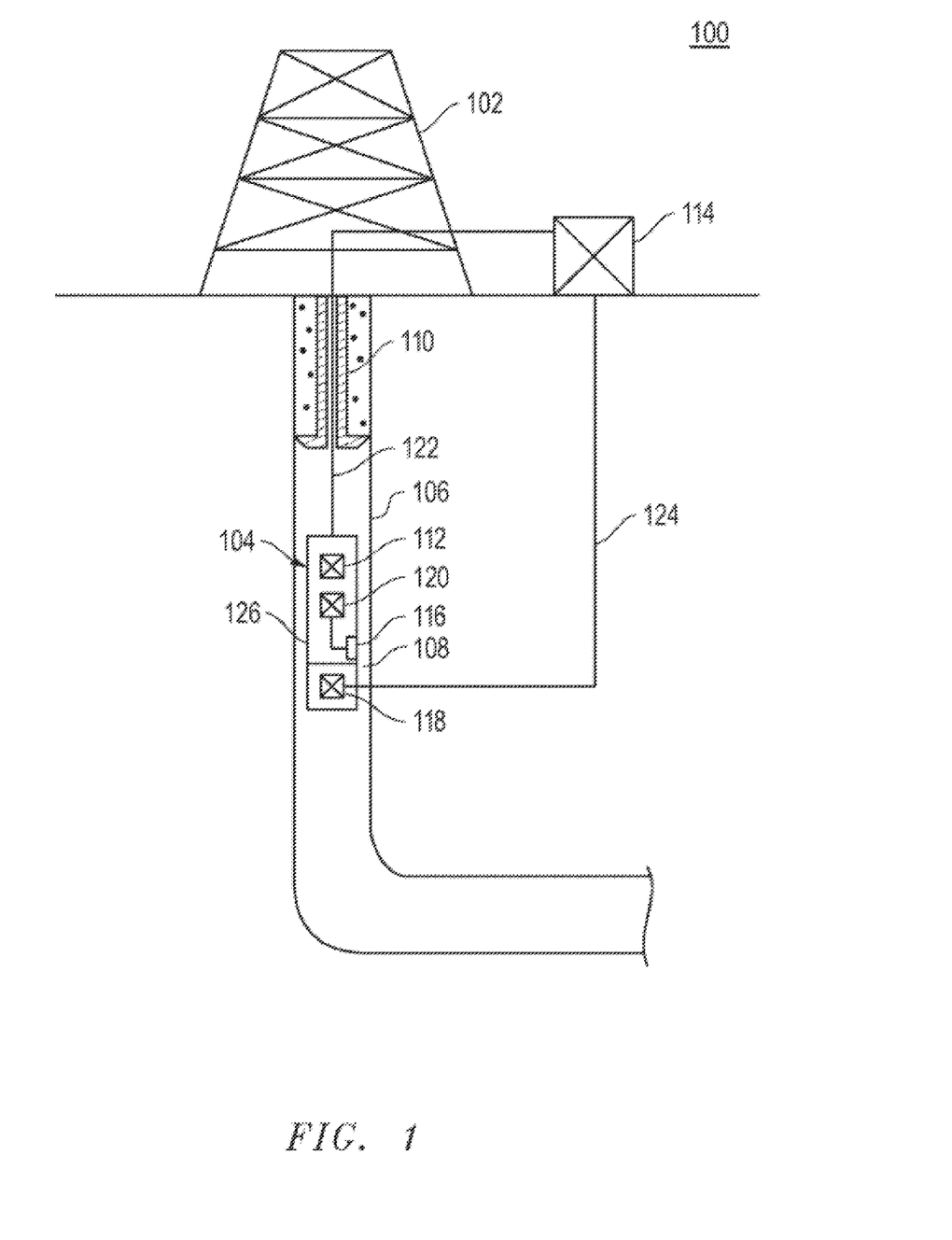
FIG. 1 is a schematic view of a system for determining downhole parameters comprising a downhole tool positioned in a wellbore, in accordance with embodiments of this disclosure.

FIG. 1 is a schematic view of a wellsite 100 having an oil rig 102 with a downhole tool 104 suspended into a wellbore 106. A drilling mud, and/or a wellbore fluid 108, may have been pumped into the wellbore 106 and may line a wall thereof. As shown, a casing 110 has also been positioned in the wellbore 106 and cemented into place therein. The downhole tool 104 may include one or more sensors for determining one or more downhole parameters, such as wellbore fluid parameters and/or formation parameters. The wellbore fluid parameters, or properties, may be determined by the one or more sensors independent of a determination of the formation parameters.

The downhole tool 104 is shown as a wireline logging tool lowered into the wellbore 106 to take various measurements. The downhole tool 104 may include a conventional logging device 112, a sensor 116, one or more telemetry devices 118, and an electronics package 120. The conventional logging device 112 may be provided with various sensors, measurement devices, communication devices, sampling devices and/or other devices for performing wellbore operations. For example, as the downhole tool 104 is lowered, it may use devices, such as resistivity or other logging devices, to measure formation parameters and/or properties.

As shown, the downhole tool 104 may be conveyed into the wellbore 106 on a wireline 122. Although the downhole tool 104 is shown as being conveyed into the wellbore 106 on a wireline 122, it should be appreciated that the downhole tool 104 may be a wireline tool, a measurement-while-drilling tool, a logging-while-drilling tool, or any suitable tool, conveyed through any suitable conveyance, such as a slick line, a coiled tubing, a drill string, a casing string and the like. The downhole tool 104 may be operatively connected to a surface unit 114 for communication between these units. The downhole tool 104 may be wired via the wireline 122, as shown, and/or wirelessly linked via the one or more telemetry devices 118. The one or more telemetry devices 118 may include any telemetry devices, such as electromagnetic devices, for passing signals to a surface unit 114 as indicated by communication links 124. Further, it should be appreciated that any communication device or system may be used to communicate between the downhole tool 104 and the surface unit 114. Signals may be passed between the downhole tool 104 and the surface unit 114 and/or other locations for communication between these units.

While the downhole tool 104 is depicted as the wireline tool 104 having the sensor 116 thereon, it will be appreciated that the sensor 116 may be positioned downhole on a variety of one or more tools. For example, the sensor 116 may be placed downhole on a drillstring, coiled tubing, drill stem tester, production, casing, pipe, or other downhole tool. Although only one sensor 116 is shown, it should be appreciated that one or more sensors 116 and/or portions of the sensors 116 may be located at several locations in the wellbore 106. The sensor 116 is preferably positioned about an outer surface of the downhole tool 104 so that the downhole fluid may pass along for measurement thereof. However, it will be appreciated that the one or more sensors 116 may be positioned at various locations about the wellsite 100 as desired for performing fluid measurement.

The electronics package 120 may include any components and/or devices suitable for operating, monitoring, powering, calculating, calibrating, and analyzing components of the downhole tool 104. Thus, the electronics package 120 may include a power source, a processor, a storage device, a signal conversion (digitizer, mixer, amplifier, etc.), a signal switching device (switch, multiplexer, etc.), a receiver device and/or a transmission device, and the like. The electronics package 120 may be operatively coupled to the sensor 116. The power source in the electronics package 120 may apply a voltage to the sensor 116. The power source may be provided by a battery power supply or other conventional means of providing power. In some cases, the power source may be an existing power source used in the downhole tool 104. The power source may be positioned, for example, in the downhole tool 104 and wired to the sensor 116 for providing power thereto as shown. Optionally, the power source may be provided for use with the sensor 116 and/or other downhole devices. Although the electronics package 120 is shown as one separate unit from the sensor 116, it should be appreciated that any portion of the electronics package 120 may be included within the sensor 116. Further, the components of the electronics package 120 may be located at various locations about the downhole tool 104, the surface unit 114 and/or the wellsite 100. The sensor 116 may also be wired or wirelessly connected to any of the features of the downhole tool 104, and/or surface unit 114, such as communication links, processors, power sources or other features thereof.

The sensor 116 may be capable of determining one or more downhole fluid parameters and/or one or more formation parameters. The downhole fluids may include any downhole fluids such as downhole mud (e.g., oil based), hydrocarbons, water and/or other downhole fluids. The sensor 116 may determine the downhole parameters of the downhole fluids and/or the downhole formations as the downhole tool 104 passes through the wellbore 106. Due to the harsh conditions of the downhole environment, the sensor 116 may be positioned on the downhole tool 104 in such a manner that the sensor 116 is capable of measuring fluids as the downhole tool 104 passes through the wellbore 106. Further, the sensor 116 may be positioned in such a manner that reduces clogging of downhole fluids as the downhole fluids pass the sensor 116. As shown, the sensor 116 is positioned on an outer surface 126 of the downhole tool 104. The sensor 116 may also be positioned at various angles and locations.

Formation properties measured by the downhole tool 104 may be processed into a borehole image. For example, portions of such processing may occur at the downhole tool 104, the surface unit 114, or at any other suitable processor. The borehole image may be received from a downhole tool 104 having any type of conveyance, and having any type of sensor geometry or arrangement, including both pad-based and rotating sensors, and input dips. For example, borehole images, as well as other images (e.g., core images) or other types of suitable data (e.g., high resolution 1D data), may be used.

Figure 2:
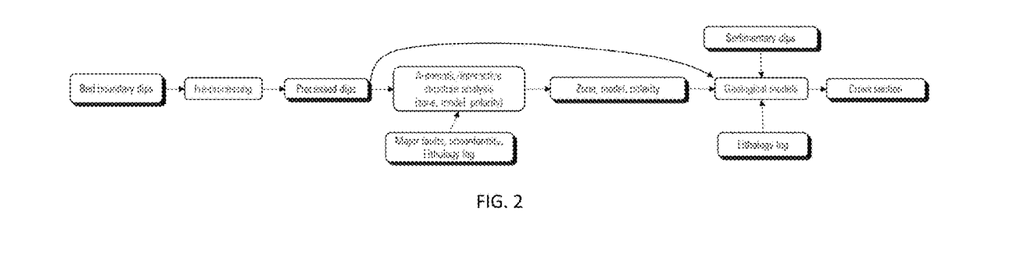
FIG. 2 is a workflow for structural analysis of formation using borehole dip data, in accordance with embodiments of this disclosure.

FIG. 2 is a workflow for using borehole dip data to generate geological cross-sections of a formation near a borehole, in accordance with one or more embodiments of the present techniques. The workflow involves using borehole dip data from formation surrounding and along a borehole trajectory, which may include bed boundary dip obtained in any suitable way, including manual delineation or automated dip detection from formation image data obtained from any suitable tool, such as from tool 104. Additionally, in some embodiments, other information may also be used in the workflow, such as faults, nonconformities, or other structural features. In some embodiments, the dip data may be pre-processed, including filtering, smoothing, calibrating, etc., resulting in processed dips. For example, filtering the dip data may remove perturbed dips which may not be consistent with the regional geological structure, such that the remaining dips are more consistent with structural dips at the regional scale. Further, structural dips may be extracted from the sedimentary structure using other suitable methods. A The workflow may also involve automatic and/or interactive structure analysis of the dips, including analysis of the zone, model, and/or polarity of the dips. The automatic and/or interactive structural analysis may involve refining zones of the same structural unit along the well trajectory. A structural unit may include a set of layers affected by a common deformation and/or tilting. Without a priori knowledge, the number of structural units penetrated by the well may not be known. In some embodiments, a zone may be identified based on the pattern of poles on the stereonet. There may be two patterns based on the geological principles. A first pattern may include a concentrated distribution observed when the structure is not deformed (e.g., monocline) and may be characterized by the mean dip and also the strike of the mean dip (e.g., the pseudo-structural axis). A second pattern may include an elongated distribution along a great circle (e.g., a cylindrical structure) or a small circle (e.g., a conical structure), and may be observed when the structure is deformed (e.g., by folds, faults with drags). The second pattern may be characterized by the structural axis which corresponds to the pole of the plane of the great or small circle and also conicity, if distributed along a conical structure.

In some embodiments, an automatic zonation method may be used, where dips may be differentiated according to the different patterns. An automatic zonation method may involve grouping consecutive dips with thresholds and combining the groups if they are considered to belong to the same structure unit after checking the pattern of dips on the stereonet. The zones may then be verified and refined by analyzing dips on several plotting tools and by using all the available external data, such as faults and nonconformities observed on the borehole image and lithological logs (e.g., gamma rays). The stratigraphic polarity for each dip may be defined to be normal or reverse, and possible geological structures may be estimated based on the structural type.

Figure 3:
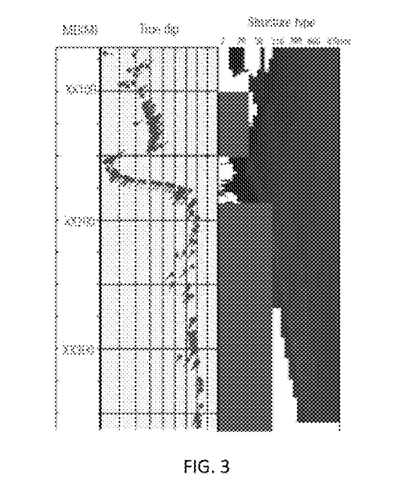
FIG. 3 is an example of structure type matrix, in accordance with embodiments of this disclosure.

In some situations, defining zones may be affected by the scale of the structure. For example, a monocline structure at a small scale may be part of the limb of a fold at a larger scale. Some embodiments involve visualizing the structure type as a function of the scale, as provided in FIG. 3, which is an example of a structure type matrix. The x-axis of the graph of FIG. 3 is the length of the scale, and the y-axis is the measured depth. The shaded region to the right represents the second pattern, and the shaded region to the left represents the first pattern. The matrix may be generated by testing for the second pattern with the dips in a sliding window along the measured depth. If the second pattern is not detected, the program may test the dips for the first pattern. The color density shows the quality of a fit represented by the fitting error. In some embodiments, a summary log may be created to represent the structure along the measured depth.

Once the structural zones are set, the workflow involves applying one or more geological models on the structural zones (and/or models, polarity) to construct geological cross-sections. In some embodiments, smoothing may be applied to further eliminate erratic dips. Further, in some embodiments, a resampling may be applied when structural dips are poorly sampled. Several geological scenarios may be analyzed by applying different models and modifying the structural zones. In some embodiments, the computed cross-section may be validated, and the display of the structure may be highlighted with a lithology log. In some embodiments, further data, such as sedimentary dips may also be used in the construction of geological cross-sections.

Different types of geological models may be used to construct the geological cross-sections. For example, two conventional geometric models involve constructing geological layers and respecting different assumptions in the geometry of the layers. The geometric models, the similar model and the parallel model, may assume similarity and parallelism, respectively, in the geometry of the layers. Both models may build layer geometries by translating dips in the direction along a specific two-dimensional plane (e.g., the translation plane). In the similar model, the translation plane may be common to all the dips, while in the parallel model, the translation plane may be unique to each dip and defined as a plane orthogonal to the dip plane.

Figure 4:
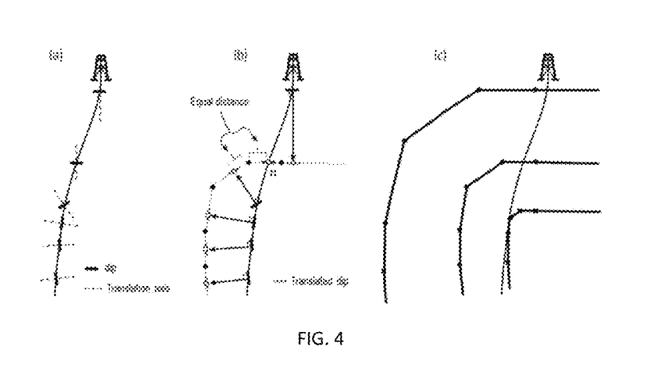
FIG. 4 is a schematic drawing representing computational steps of a parallel model, in accordance with embodiments of this disclosure.

The computation steps of the parallel model is represented in the schematic diagram of FIG. 4. In FIG. 4a, dips and translation planes are projected on a two dimensional plane, where dips are represented by the solid lines, and the translation plane is represented by the dotted translation axis. Layer lines are then created using only the angles of the dip lines. A layer line at the $n^{th}$ dip may be successively extended by translating dip lines one after another in the respective directions of their translation axis, and then linked at the intersection. The position of the translated dip line is constrained by the previous neighboring dip line. In other words, the translated line and the previous line is at the same distance from the intersection of their extended lines, as shown in FIG. 4b. The computed layer line for the $n^{th}$ dip is a polyline (i.e., continuous line composed of line segments, made with intersections of the extended lines of the $n^{th}$ dip and the N-1 translated dips, where N is the number of input dips. FIG. 4c shows the geometry of layers computed for the first, second, and fourth dips from the top.

Figure 5:
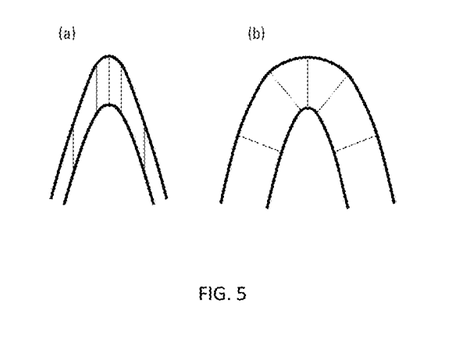
FIG. 5 is a schematic drawing representing the geometry of a similar fold and a parallel fold, in accordance with embodiments of this disclosure.

Using a common translation plane for all the dips results in layers having the same thickness in the direction of the translation axis and identical geometries in the layers. This corresponds to the definition of the geometry of similar fold. The layer thickness of the similar fold may be constant in the direction of the axial plane, as shown in FIG. 5a. In the similar fold model, the translation plane is selected so that it corresponds to the axial plane, which goes through the middle of the elongated cloud of poles on the stereonet. The method may be applicable to faults with drags, rollover and monocline structures, assuming they are similar structures or part of a similar structure. The translation planes may be defined as the fault plane, the detachment pland, and the plane containing the pole of the mean dip, respectively. On the other hand, the parallel model preserves the layer thickness measured perpendicularly to the initial dips, which corresponds to the layer thickness before folding, as shown in FIG. 5b. This corresponds to the definition of the parallel fold. The instability of the parallel model may be due to the translation axes crossing each other inside the hinge zone of folds.

In one or more embodiments of the present techniques, a workflow for using borehole dip data to create geological cross-sections may involve using a web model for modeling the cross-sections. The web model may involve the creation of radials (e.g., warp threads) and methodically making a spiral (e.g., weft thread) using the radials as guide lines. The web may not be made of concentric circles, but may instead be a spiral. The geometry of the web may be similar to that of a concentric fold whose layer thickness is parallel.

The web method may also include two steps. A first step of the web method may be to construct warm threads (e.g., the guiding web) and dip propagation using the warp threads. The cross section may be created on a two-dimensional plane where the true thickness is preserved and represents the structure. In instances where the dips follow the second pattern, the plane perpendicular to the structural axis may be the plane on which the structural cross section must be constructed. In instances where the dips follow the first pattern, the plane perpendicular to the pseudo-structural axis may be used. The stratigraphic polarity of dips may also be taken into account.

Figure 6:
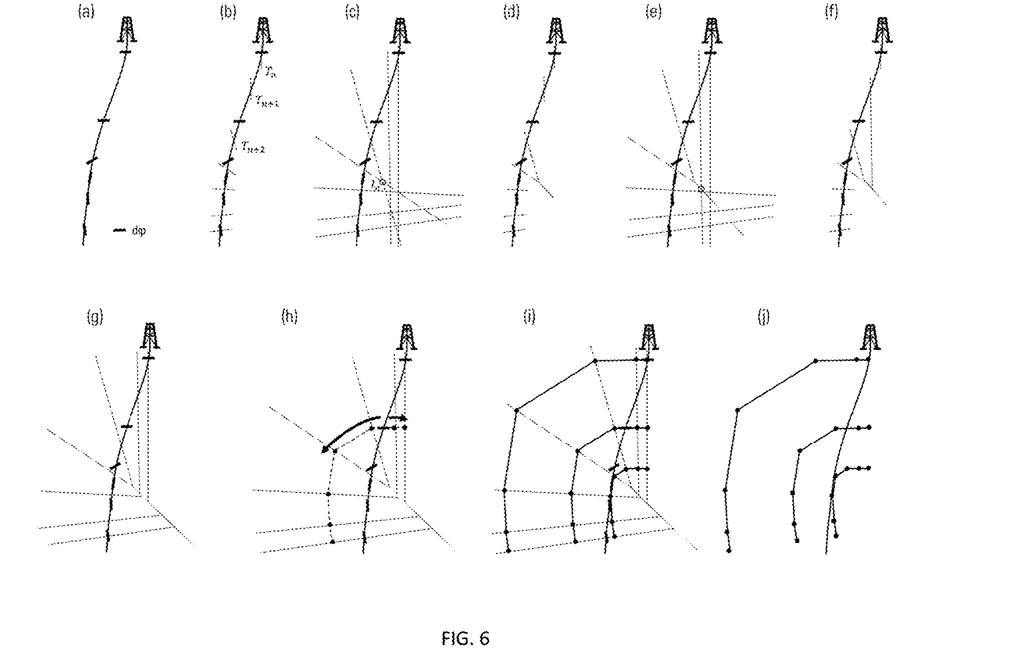
FIG. 6 is a schematic drawing representing computational steps of a web model, in accordance with embodiments of this disclosure.

FIG. 6 is a schematic drawing representing the computational steps of the web model in accordance with the present techniques. A guiding web may be created from the dips on the well trajectory, as shown in FIG. 6a. The threads drawn in FIG. 6b represent the bisectors of perpendiculars of adjacent dips placed between the two adjacent dips. In some embodiments, the input data may be maximized by adding the perpendiculars of the top and bottom dips, so that the number of initial threads corresponds to the number of initial dips plus one.

The bisector threads of FIG. 6b may be extended, and an intersection of bisector threads closest to the well trajectory may be identified, as represented in FIG. 6c. The bisector threads may be stopped at the intersection (e.g., of $T_n$ and $T_{n+1}$), and continued with a new thread, as shown in FIG. 6d. The set of threads may be updated by removing the bisector lines of the intersection (e.g., $T_n$ and $T_{n+1}$) and adding a new thread from the intersection (e.g., $T_{new}$). The direction of the new thread may be defined as the bisector of the perpendicular to the dips just above $T_n$ and just below $T_{n+1}$. As shown in FIGS. 6e and 6f, the identification of a new intersection and a continuation of a new thread from the intersection may be iteratively performed, extending the guide line along the intersections. The iteration may end when no more intersection is found, or if there is only one thread in the set, as shown in FIG. 6g. The warp threads delineates the two-dimensional plane into several areas, with each area containing one dip.

The second portion of the web model is the creation of the cross-section by extending the input dips. The input dips may be extended to reach the limit of their area, where the lines continue but use the dip angle of the next area, as shown in FIG. 6h. FIG. 6i shows additional extension of input dips for more of the dips along the trajectory, and FIG. 6j shows a portion of the resulting cross-section. The outside of the hinge zone shows the same geometry as in the parallel model, but in the web model, the inside of the hinge zone is also reconstructed due to the merged guiding threads. As such, the web model may be effective for constructing parallel layers including a parallel fold in a vertical well and a monocline structure in a horizontal well. The method may not work when the input dips are nearly perpendicular to the well trajectory, because the guiding web becomes very narrow and dips cannot be propagated away from the well. The gradual change of dips may lead to a smoother geometry at the hinge zone of the fold.

Figure 7:
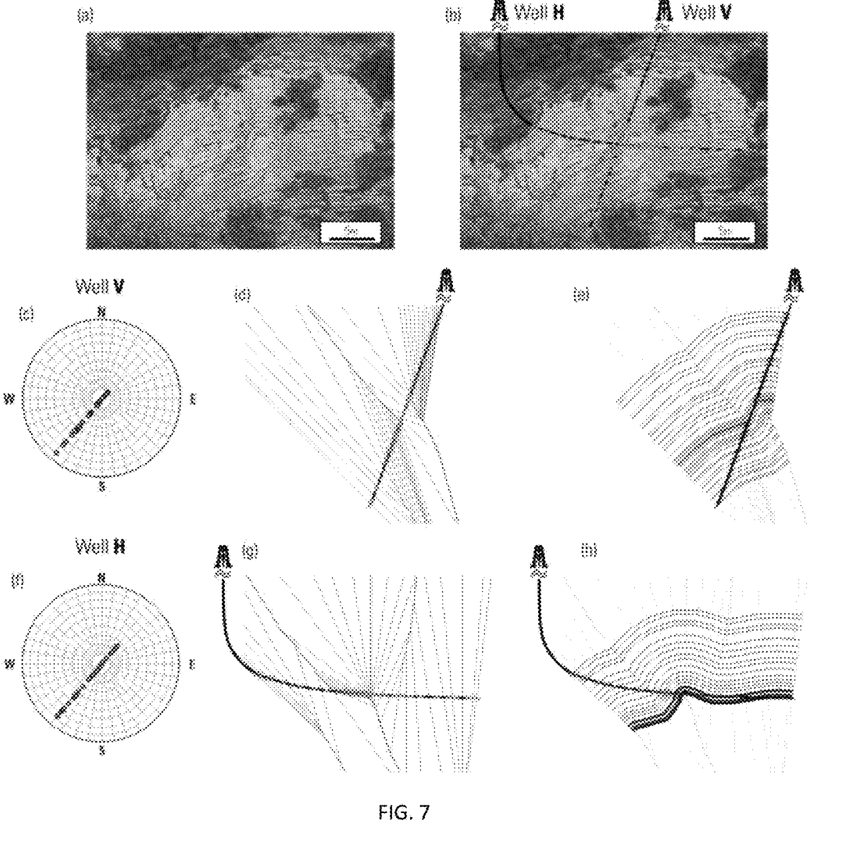
FIG. 7 is a representation of the web model applied to a well, in accordance with embodiments of this disclosure.

FIG. 7 shows photos, stereonets, and portions of geological cross-sections obtained using the workflow and web model of the present techniques. The geological structure in FIG. 7 was folded with anticlines and synclines of different wavelengths and layer thicknesses. The dips show a second pattern on the stereonet, where the middle part is an anticline fold with smaller curvature than the rest. The right side of the structure extends relatively horizontally. Well V was drilled vertically from the right side of the limb, and well H was drilled horizontally through the fold axes. Geological cross-sections were created for both vertical and horizontal wells, as shown in FIGS. 7e and 7h, respectively. As can be seen in FIG. 7e, the dips are propagated sufficiently to the left side because the angle between the perpendicular of the bottom dip and the well is relatively large, while the right side is not because the corresponding angle of the top dip is small. In well H, a relatively large volume of the structure can be reconstructed.

Figure 8:
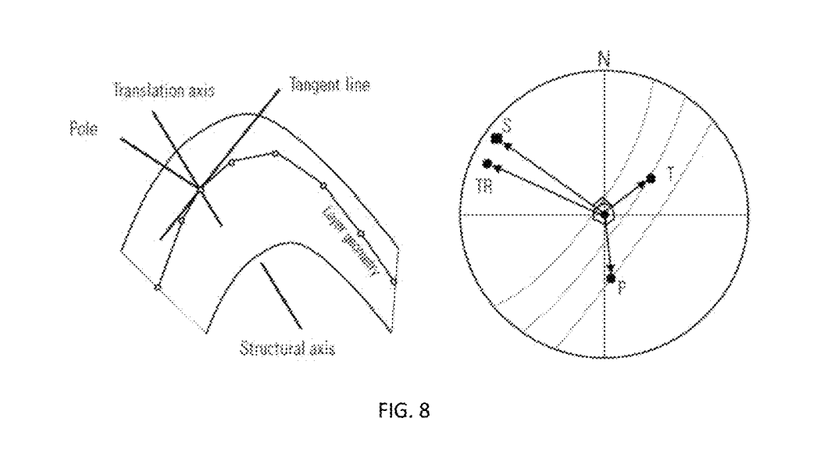
FIG. 8 is a schematic drawing representing the relationship between axes on the stereonet in the web model, in accordance with embodiments of this disclosure.
Figure 10:
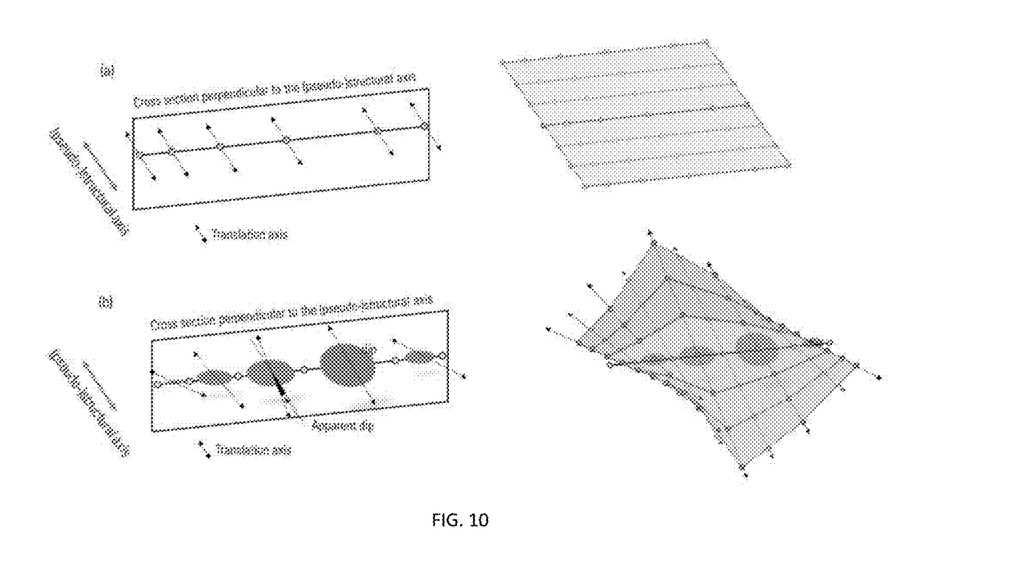
FIG. 10 are graphical models showing a three-dimensional surface models comparing when the transversal component of dips are taken into account and when the transversal component of dips are not taken into account, in accordance with embodiments of this disclosure.

In some embodiments, the cross-section may be computed on a plane perpendicular to the structural axis (e.g., the second pattern) of the pseudo-structural axis (e.g., the first pattern). Assuming that the structure is continuous in the direction perpendicular to the cross-sectional plane, the three-dimensional model may be created by translating the nodes composing the layer lines on the two-dimensional cross-section along an axis (e.g., the translation axis). The translation axis of a cylindrical structure and a monocline structure correspond to the structural axis and the pseudo-structural axis, respectively, and they may be common to all the nodes. For conical structures, the translation axis deviates relative to the structural axis by an angle that is equal to the difference between 90 degrees and the degree of conicity. Based on this angle, the orientation of the tangent line may be computed by rotating the pole around the structural axis by approximately 90 degrees, as shown in FIG. 8. FIG. 8 includes schematic representation of the axes on the stereonet, dipping 10 degrees in azimuth 305 degrees, where the conicity of the small circle is 75 degrees. The translation axis may correspond to the outer product of the pole and the tangent line. In some embodiments, the method may be generalized for cylindrical structures whose conicity is approximately 90 degrees. Additionally, in some embodiments, the transversal component of dips (e.g., apparent dip inclination in the azimuth of structural axis) may be taken into account, as represented in FIG. 10b. In these instances, the translation axis may be smoothed taking into account the length of segment (i.e., smaller weight on smaller segments) and the overall effect of transversal component may be adjusted (e.g., from 0, no effect, to 1, full effect).

Figure 9:
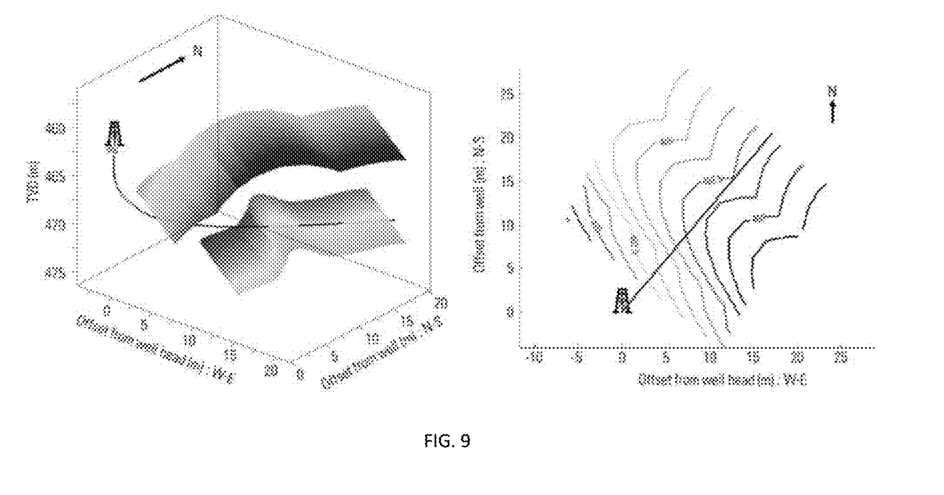
FIG. 9 are graphical models showing a near-well three-dimensional structure model and a contour map of the top layer of the model, in accordance with embodiments of this disclosure.

FIG. 9 shows the near-well three-dimensional model of the structure computed in the well H of FIG. 7, as well as its map view. The well may be assumed to be in the direction of the azimuth of approximately 40 degrees. The structural axis may be perpendicular to the computed cross-section (i.e., dipping an angle of approximately 20 degrees towards a 310 degree azimuth). The offset of projection may be set (e.g., to approximately 50 meters).

To display a cross-section on a given plane, and not only perpendicularly to the structural axis, the intersections of the three-dimensional surfaces and the plane may be computed. The cross-section may be a vertical section containing the well trajectory, and may be approximated by a set of vertical planes. The computed cross-section may also be projected on the curtain section by searching the intersections between the three-dimensional surfaces and the vertical planes. Alternatively, in some embodiments, the three-dimensional model may be created from multiple cross-sections created on several planes with varying angles. The cross-sections may be used in a three-dimensional space, and all the layers nodes form a given layer boundary may be recognized and connected.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   inputting borehole dip data obtained by measuring downhole one or more parameters of a borehole with a downhole logging tool;
   determining characteristics of a plurality of dips based on the borehole dip data, wherein the characteristics include dip angle along the trajectory of the borehole;
   applying one or more geological models to the characteristics, wherein applying one or more geological models comprises applying a web model utilizing threads drawn between two adjacent dips of the plurality of characterized dips and extending each of the plurality of dips using the threads; and
   generating one or more geological cross-sections in the vicinity of the borehole based on geological modeling.

2. The method of claim 1, further comprising pre-processing the borehole dip data using filtering, smoothing, calibrating, or combinations thereof.

3. The method of claim 1, further comprising removing perturbed dips inconsistent with a regional geological structure.

4. The method of claim 1, wherein determining characteristics of a plurality of dips comprises analyzing the borehole dip data to determine a zone, model, polarity, or combinations thereof, of the plurality of dips.

5. The method of claim 1, wherein the method further comprises computing the lamination properties, wherein the computation comprises classifying lamination according to thick laminations or thin laminations.

6. The method of claim 1, wherein applying one or more geological models comprises applying a web model utilizing bisectors of perpendicular lines drawn between two adjacent dips of the plurality of dips.

7. The method of claim 6, wherein applying the web model comprises:
   determining a plurality of bisector threads, each bisector thread of the plurality of bisector threads being a bisector of a perpendicular of two adjacent dips;
   placing each bisector thread between its respective two adjacent dips;
   identifying an intersection of the plurality of bisector threads, wherein the intersection is a point closest to a wellbore trajectory;
   determining a new iteration of a plurality threads including an intersection thread from the intersection; and
   iteratively determining a new iteration of the plurality of threads until there is no more intersection of the threads.

8. The method of claim 7, further comprising creating a hinge zone based on the iterative threads.

9. The method of claim 8, comprising extending input dips from the borehole dip data into the hinge zone.

10. The method of claim 9, comprising generating a cross-section based on the extension of input dips.

11. A system, comprising:
    a downhole logging tool configured to measure one or more parameters of a borehole and generating borehole dip data based on the measured parameters;
    a processor that is configured to:
    receive borehole dip data generated by the downhole logging tool;

determine characteristics of a plurality of dips based on the borehole dip data, wherein the characteristics include dip angle along the trajectory of the borehole;

apply one or more geological models to the characteristics, wherein applying one or more geological models comprises applying a web model utilizing threads drawn between two adjacent dips of the plurality of characterized dips and extending each of the plurality of dips using the threads; and generate one or more geological cross-sections in the vicinity of the borehole based on geological modeling.

12. The system of claim 11, wherein the processor is further configured to pre-process the borehole dip data using filtering, smoothing, calibrating, or combinations thereof.

13. The system of claim 11, wherein the processor is further configured to remove perturbed dips inconsistent with a regional geological structure.

14. The system of claim 11, wherein determining characteristics of a plurality of dips comprises analyzing the borehole dip data to determine a zone, model, polarity, or combinations thereof, of the plurality of dips.

15. The system of claim 11, wherein the processor is further configured for computing the lamination properties, wherein computing comprises classifying lamination according to thick laminations or thin laminations.

16. The system of claim 11, wherein applying one or more geological models comprises applying a web model utilizing bisectors of perpendicular lines drawn between two adjacent dips of the plurality of dips.

17. The system of claim 16, wherein applying the web model comprises:

determining a plurality of bisector threads, each bisector thread of the plurality of bisector threads being a bisector of a perpendicular of two adjacent dips;

placing each bisector thread between its respective two adjacent dips;

identifying an intersection of the plurality of bisector threads, wherein the intersection is a point closest to a wellbore trajectory;

determining a new iteration of a plurality threads including an intersection thread from the intersection; and iteratively determining a new iteration of the plurality of threads until there is no more intersection of the threads.

18. The system of claim 17, wherein the processor is further configured to create a hinge zone based on the iterative threads.

19. The system of claim 18, wherein the processor is further configured to extend input dips from the borehole dip data into the hinge zone.

20. The system of claim 19, wherein the processor is further configured to generate a cross-section based on the extension of input dips.

* * * * *